US012761879B2

(12) United States Patent
Geoghegan et al.

(10) Patent No.: US 12,761,879 B2
(45) Date of Patent: Oct. 13, 2026

(54) IDENTIFYING AND ISOLATING UNIQUE MONOLITHIC APPLICATION CODE

(71) Applicant: INTERNATIONAL BUSINESS MACHINES CORPORATION, Armonk, NY (US)

(72) Inventors: Kieran Geoghegan, Innishannon (IE); Paul Barry, Douglas (IE); Fuguo Huang, Helsinki (FI); Vinh Tuan Thai, Markham (CA); Ryan Thomas Claussen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 18/516,048

(22) Filed: Nov. 21, 2023

(65) Prior Publication Data

US 2025/0165224 A1 May 22, 2025

(51) Int. Cl.
*G06F 8/30* (2018.01)
*G06F 11/3604* (2025.01)

(52) U.S. Cl.
CPC ............ *G06F 8/30* (2013.01); *G06F 11/3604* (2013.01)

(58) Field of Classification Search
None
See application file for complete search history.

(56) References Cited

U.S. PATENT DOCUMENTS 9,740,480 B1 8/2017 Ghouti et al.
10,579,370 B2 * 3/2020 Gupta ........................ G06F 8/20
11,099,820 B2 8/2021 Punathil et al.
11,620,128 B1 4/2023 Chawda et al.
11,775,271 B1 * 10/2023 Singh ........................ G06N 3/08 717/137
2017/0242691 A1 8/2017 Ghouti et al.
2019/0205106 A1 7/2019 Sharma et al.
2020/0401386 A1 * 12/2020 Punathil .................. G06F 8/433
2021/0232390 A1 7/2021 Hwang et al.
2023/0084685 A1 3/2023 Tamilselvam et al.
2023/0094887 A1 3/2023 Sridhara et al.

OTHER PUBLICATIONS

Anonymous, "Diluting Outliers for Refactoring Monolith Application through Attributed Graph Embeddings", Sep. 7, 2020; 6 Pages.
Anonymous, "Application Modernization Services Market worth $32.8 billion by 2027", Mar. 2, 2023; 7 Pages.
IBM, "IBM Signs Strategic Collaboration Agreement with Amazon Web Services to Deliver IBM Software as-a-Service on AWS", May 11, 2022; 3 Pages.
Rafalin, "Why Monolithic Applications Put Pressure on Your Personnel, Part 1", Aug. 2, 2022; 6 Pages.

* cited by examiner

*Primary Examiner* — Lewis A Bullock, Jr.
*Assistant Examiner* — Mark A Gooray
(74) *Attorney, Agent, or Firm* — Seed Intellectual Property Law Group LLP

(57) ABSTRACT

A processor set is configured to receive code associated with a monolithic application. The processor set further discovers hidden internal common code by analyzing the received code and identifies unique application code based on the discovered hidden internal common code. The processor set may also generate a unique code module including the unique application code. The unique code module may be transmitted to a user device.

18 Claims, 8 Drawing Sheets

IDENTIFYING AND ISOLATING UNIQUE MONOLITHIC APPLICATION CODE

BACKGROUND

Aspects of the present invention relate generally to computer systems and, more particularly, to modernizing monolithic applications in a computer system.

Application modernization is a practice in which older software is updated. This type of modernization can include converting applications to use code written in newer languages, updating software libraries, using newer architectures such as microservices, and employing newer protocols or hardware platforms. A customer may seek to modernize some, or all, of the applications employed in their organization.

Application modernization includes considering applications as they exist in the current computing environment, such as a monolith application, and identifying applications that are best suited for modernization.

SUMMARY

In a first aspect of the invention, there is a computer-implemented method including: receiving, by a processor set, code associated with a monolithic application; discovering, by the processor set, hidden internal common code by analyzing the code associated with the monolithic application; identifying, by the processor set, unique application code based on discovering the hidden internal common code; generating, by the processor set, a unique code module comprising the unique application code; and transmitting, by the processor to a user device, the unique code module.

In another aspect of the invention, there is a computer program product including one or more computer readable storage media having program instructions collectively stored on the one or more computer readable storage media. The program instructions are executable to receive code associated with a monolithic application; discover hidden internal common code by analyzing the code associated with the monolithic application; identify unique application code based on discovering the hidden internal common code; generate a unique code module comprising the unique application code; and transmit, to a user device, the unique code module.

In another aspect of the invention, there is a system including a processor set, one or more computer readable storage media, and program instructions collectively stored on the one or more computer readable storage media. The program instructions are executable to receive code associated with a monolithic application; discover hidden internal common code by analyzing the code associated with the monolithic application; identify unique application code based on discovering the hidden internal common code; generate a unique code module comprising the unique application code; and transmit, to a user device, the unique code module.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
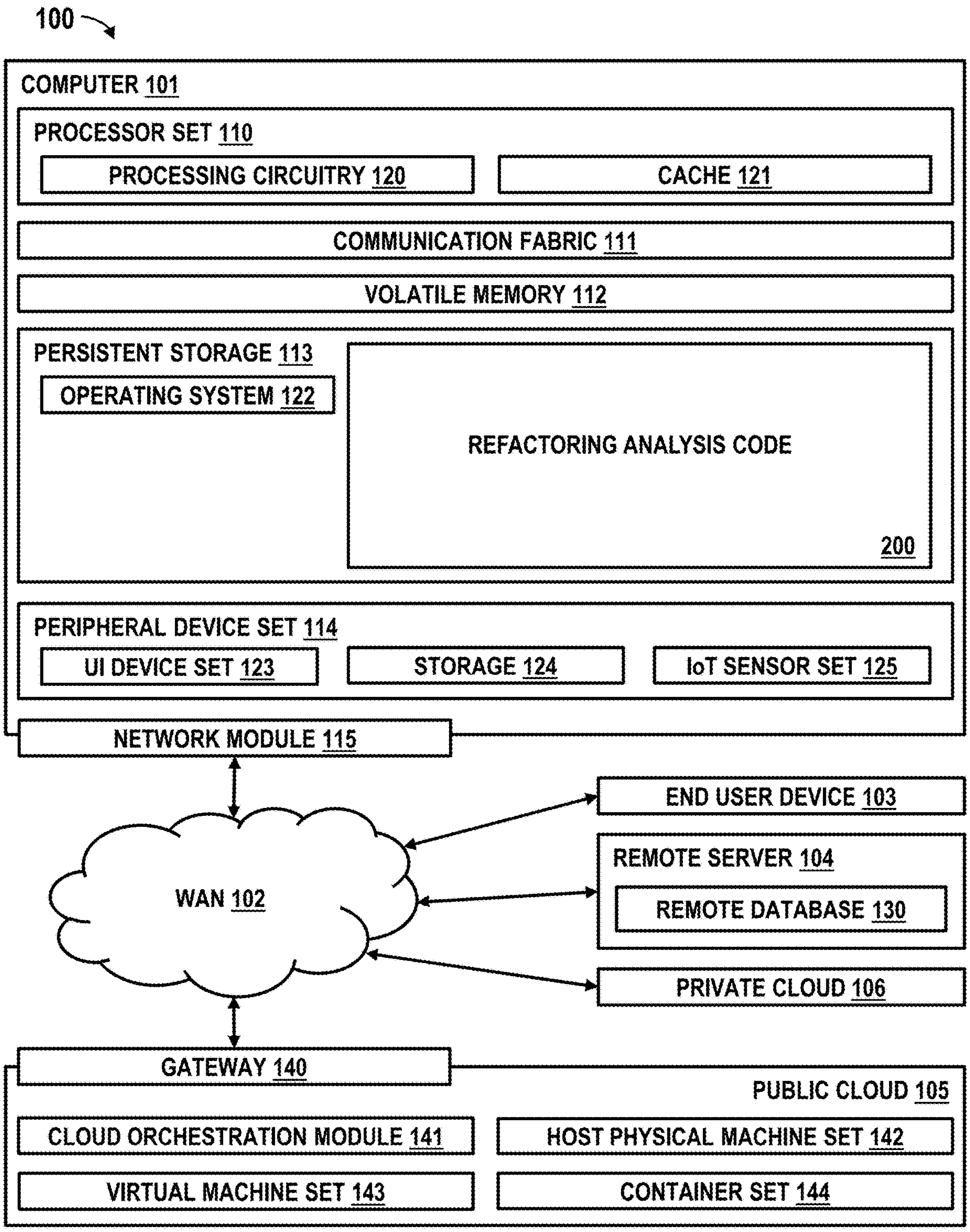
FIG. 1 depicts a computing environment according to an embodiment of the present invention.

Aspects of the present invention relate generally to computer systems and more specifically to identifying and isolating unique application code based on discovering common code within a monolithic application binary code. According to aspects of the invention a processor set receives or obtains binary code associated with a monolithic application, discovers hidden internal common code within the binary code, and identifies unique application code based on the discovered hidden internal common code. In embodiments, the processor set generates a unique code module that contains the unique application code, thereby reducing the complexity of future refactoring and modernization techniques.

Embodiments and aspects of this invention provide a precise analysis of a monolith application to identify and isolate unique application code for refactoring to a microservice architecture. With zero application knowledge and without access to the source code, embodiments and aspects of this invention reduce a given monolith application to include only the most relevant relationships when considering a refactoring to microservices activity for the application. This functionality is provided by analyzing the application in the context of an estate of applications (e.g., a plurality of applications belonging to an enterprise) to find components common across applications. The system may also use a static analysis to generate a call graph to identify packaging opportunities for internal common code that facilitate refactoring to microservices.

Monolithic applications are built as a single deployable unit. Over time such programs generally grow in complexity and typically lose internal cohesiveness to the point that future changes are difficult to make and generally lead to unexpected outcomes.

For example, many enterprises have business-critical monolithic legacy applications that have been running for a long time, perhaps ten to fifteen years, or longer. During that time, the applications of that age typically underwent several updates, iterations, re-writes, re-designs, and more (collectively referred to as "modifications"). These modifications often make the legacy applications difficult to understand, maintain, and enhance, and they are difficult to modernize. Legacy approaches to refactoring applications are typically manual in nature. Naturally, such manual approaches are time consuming and expensive, and they require specialized skills and experience on the part of the developers. Even after spending significant resources on the manual refactoring, efforts are often abandoned due to complexity, unforeseen patterns or dependencies in the code, and inconsistency between architectural knowledge about the original applications and its current implementations. Users often rely on using what is often referred to as a "strangler pattern" or a domain-driven design to refactor out a few microservices that typically lie on the edge of the applications, while mostly leaving the core business modules of the applications where the actual complexities reside untouched due to their overwhelming complexities.

Additional challenges arise when refactoring a monolithic application to microservices. First, over the years, new frameworks or design patterns were frequently added to the monolithic application. The extensions of the monolithic application often attempted to duplicate functionalities of the monolithic application to fit with the new design patterns, while leaving older functional duplicates in places and operating in tandem. Monolithic applications often employ shortcuts and anti-patterns to previously well-encapsulated objects and well-defined functional interfaces. These blended implementations are not clean realizations of the original application monolithic architectures. As a result, it is difficult for a user to fully comprehend the actual operational processes in use by the current applications.

The design and paradigm differences between monolithic applications and microservices create additional complications. For example, typical enterprise monolithic applications implement centralized business processes that rely on serialized transactions and commonly share synchronized data objects and states. In contrast, microservices and other modern applications are generally based on a distributed computing architecture, which foregoes centralized process models in favor of eventual synchronization and distributed object states. As such, this is a drastic change in how applications are designed. Therefore, it is difficult to understand and manually identify each of the transactional and object dependencies (both state and data) existing in the legacy monolith applications.

In short, refactoring existing monolithic applications to leverage a microservices architecture may have many benefits. However, for some applications, the effort and risk involved in refactoring may outweigh any potential upside. In an organization where there are possibly hundreds of applications that need to be modernized, there is a need to be able to rapidly and accurately identify applications that may make good candidates for refactoring to microservices. If applications are not technically suitable for refactoring to microservices and if unique application code cannot be identified or isolated, an organization may benefit from knowing that, so that an alternative modernization strategy can be selected, and effort is not wasted on a fruitless modernization path.

The embodiments and aspects disclosed herein provide a way for optimizing the precise analysis of a monolith application for the purpose of determining if the application is technically suitable to be refactored to microservices by identifying and isolating unique application code. The precision of analysis relates to accurately defining those parts of the monolith application that may be considered when trying to understand how feasible it is to refactor to microservices. The aspects and embodiments of this invention provide an automated computer-implemented method that is cheaper, more efficient, and much more accurate than conventional methods.

Implementations of the invention are necessarily rooted in computer technology. For example, the steps of analyzing the code to determine and/or discover explicitly declared common code, hidden external common code, third party code, and hidden internal common code are computer-based and cannot practically be performed in the human mind (or with pen and paper) due to the complexity and massive amounts of data and calculations involved. Given this scale and complexity, it is simply not possible for the human mind, or for a person using pen and paper, to perform the number of calculations involved in analyzing the code to determine and/or discover explicitly declared common code, hidden external common code, third party code, and hidden internal common code, as disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as refactoring analysis code of block 200. In addition to block 200, computing environment 100 includes, for example, computer 101, wide area network (WAN) 102, end user device (EDU) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI)

device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
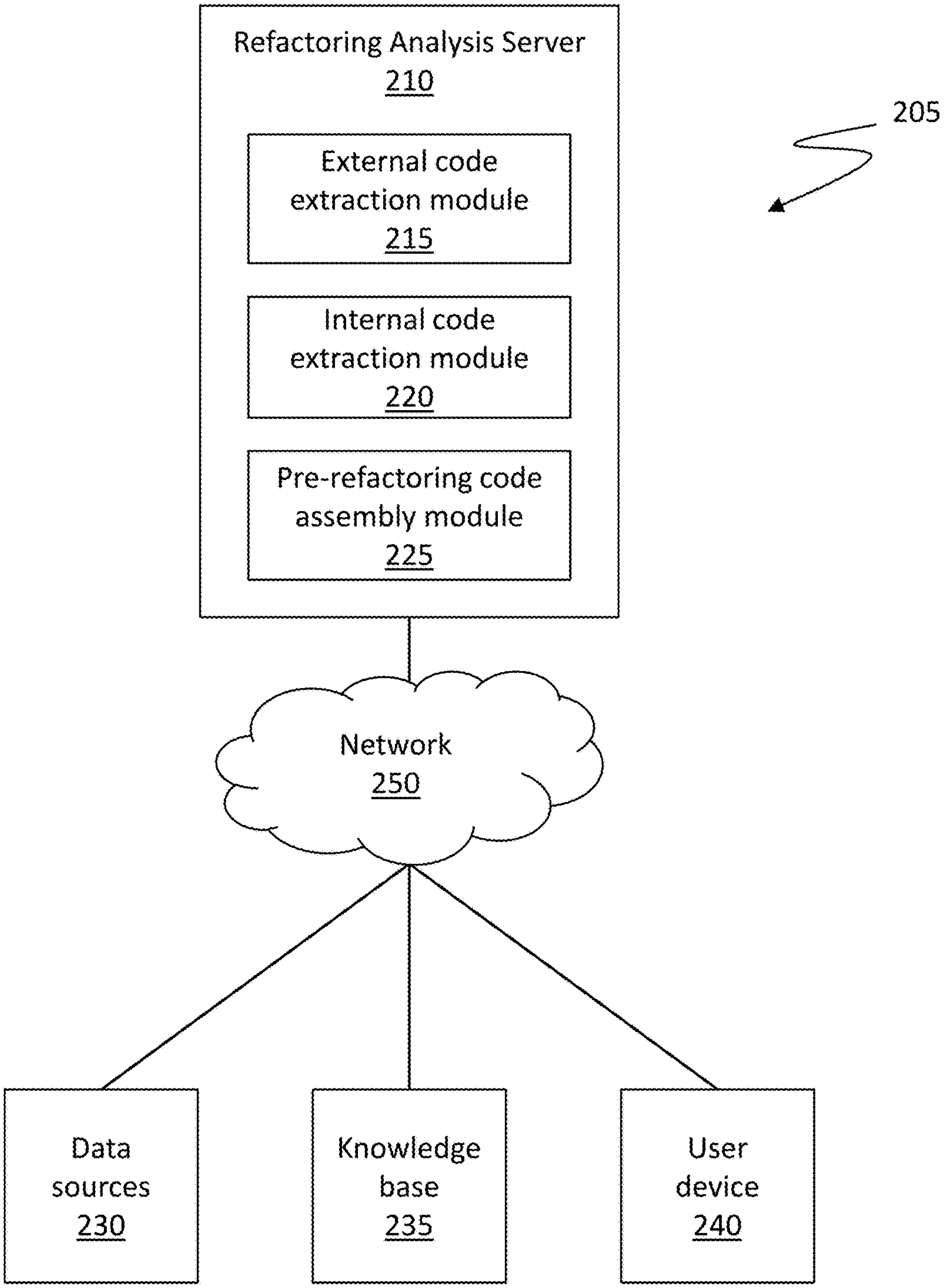
FIG. 2 shows a block diagram of an exemplary environment in accordance with aspects of the present invention.

FIG. 2 shows a block diagram of exemplary environment 205 in accordance with aspects of the invention. In embodiments, environment 205 includes a refactoring analysis server 210, data sources 230, knowledge base 235, user device 240, and network 250.

The refactoring analysis server 210 may comprise one or more instances of computer 101 of FIG. 1. In another example, refactoring analysis server 210 may comprise one or more virtual machines or containers running on one or more instances of computer 101 of FIG. 1. In embodiments, refactoring analysis server 210 communicates with data sources 230, knowledge base 235, and user device 240, via network 250, which may comprise WAN 102 of FIG. 1. In embodiments, data sources 230 comprise one or more data sources each comprising an instance of remote database 130 of FIG. 1. In embodiments, knowledge base 235 comprises one or more knowledge bases each comprising an instance of remote database 130 of FIG. 1. In embodiments, and user device 240 each comprise an instance of end user device 103 of FIG. 1. There may be plural different instances of user device 240 used by different users and evaluators, respectively.

In embodiments, refactoring analysis server 210 of FIG. 2 comprises an external code extraction module 215, internal code extraction module 220, and pre-refactoring code assembly module 225, each of which may comprise modules of refactoring analysis code of block 200 of FIG. 1. Such modules may include routines, programs, objects, components, logic, data structures, and so on that perform a particular task (or tasks) or implement a particular data type (or types) that the refactoring analysis code of block 200 uses to carry out the functions and/or methodologies of embodiments of the invention as described herein. These modules of refactoring analysis code of block 200 are executable by processing circuitry 120 of FIG. 1 to perform the inventive methods as described herein. The refactoring analysis server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, external code extraction module 215 is configured to parse and analyze the monolithic application to determine, discover, and/or identify common code within the analyzed monolithic application. In one example, external code extraction module 215 is configured to analyze the monolithic application to determine, discover, and/or identify any binary code that is explicitly declared as common code. As used herein, explicitly declared common code is code that is common across multiple applications and is explicitly declared as such. In one example, certain Java application servers have a capability to define shared libraries which consist of one or more Java archive (JAR) files. These types of defined shared libraries having one or more JAR files are an example of explicitly declared common code.

In another example, external code extraction module 215 is additionally (or alternatively) configured to analyze the monolithic application to determine, discover, and/or identify any external common code within the monolithic application. As used herein, hidden external common code is code that is common across multiple applications, but is not explicitly declared as such. In one example, in a Java enterprise application, a JAR file is packaged inside multiple web application archive or web application resource files. These types of JAR files packaged inside a multiple web application archive or web application resource files are an example of hidden external common code.

In accordance with aspects of the invention, internal code extraction module 220 is configured to analyze the monolithic application to determine, discover, and/or identify any third-party code within the monolithic application. As used herein, third-party code is code that is used within the received or accessed monolithic application but is not explicitly declared as such. In other words, a developer may implement third-party software or third-party tools within the monolithic application, including, for example, a third-party package manager for a JavaScript runtime environment. A third-party package manager is an example of code that would be determined, discovered, and/or identified as third-party code.

According to another aspect of the invention, internal code extraction module 220 is configured to analyze the monolithic application to determine, discover, and/or identify any hidden internal common code within the monolithic application. As used herein, hidden internal common code is code that is internal to a single application, but is used by multiple software components within that application. In one example, a Java application may have a custom logging utility that is used by every component in the application. Because the custom logging utility is used by every component in the application, it is considered hidden internal common code.

According to another aspect of the invention, internal code extraction module 220 is configured to analyze the monolithic application to determine, discover, and/or identify any unique application code within the monolithic application. As used herein, unique application code is code that is internal to a single application and is not used by multiple software components within that application. For example, a utility that is only used by one component in the application is considered unique application code.

In accordance with aspects of the invention, pre-refactoring code assembly module 225 is configured to isolate pre-refactoring code (e.g., unique application code) by excluding the common code and third-party code determined, discovered, and/or identified by one or more of external code extraction module 215 and internal code extraction module 220.

In an embodiment, pre-refactoring code assembly module 225 is also configured to generate a unique code module that includes at least the isolated pre-refactoring code. According to an aspect of the invention, the unique code module may be transportable. In other words, the unique code module is generated in a manner to make it transmittable or transferable to one or more user devices 240 via network 250. In additional embodiments the pre-refactoring code assembly module 225 is also configured to generate a reusable module that includes relied-upon common code and/or third-party code.

Figure 3:
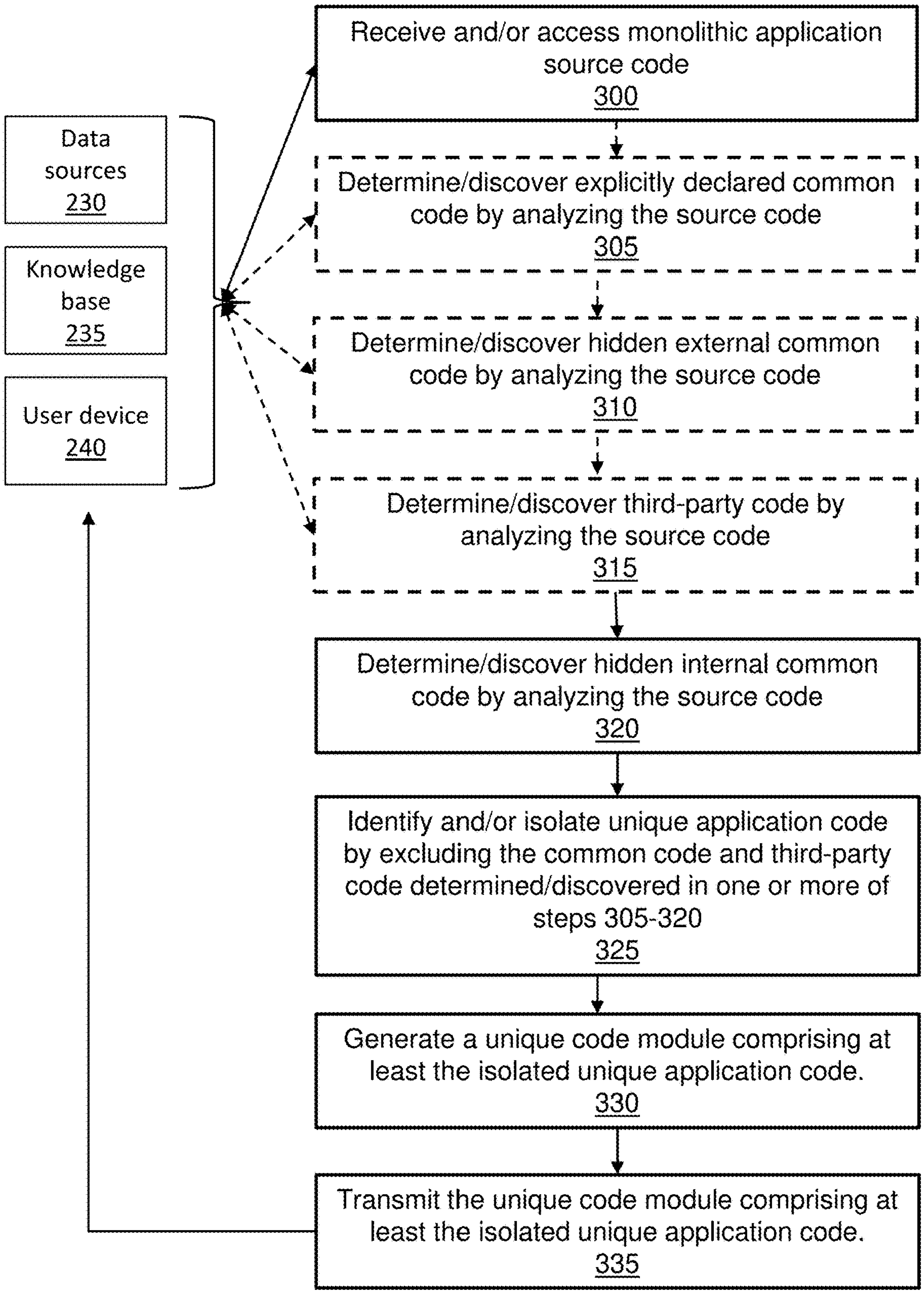
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At block 300, refactoring analysis server 210 of FIG. 2 receives, or otherwise accesses, a monolithic application to be analyzed for its suitability for being refactored to a microservice architecture. In embodiments, refactoring analysis server 210 receives the monolithic application to be analyzed from data sources 230, knowledge base 235, or user device 240 via network 250. In another embodiment, refactoring analysis server 210 accesses the monolithic application to be analyzed at data sources 230, knowledge base 235, or user device 240 over network 250.

At block 305, external code extraction module 215 of FIG. 2 additionally, or optionally, to determines, discovers, and/or identifies any binary code that is explicitly declared as common code by analyzing the monolithic application (e.g., the binary code of the monolithic application). As noted above, in an example, certain Java application servers have the capability to define shared libraries which consist of one or more Java archive (JAR) files. In this scenario, the external code extraction module 215 determines, based on the application's use of defined shared libraries that consist of one or more archive files, that the analyzed binary code is explicitly declared common code.

In another example, external code extraction module 215 discovers the explicitly declared common code by interrogating the application deployment platform configuration such as a shared library configuration on a cloud infrastructure application server. In this scenario, external code extraction module 215 employs an automated script to interrogate an application server that has a scripting interface that can provide the shared library configurations. In response to such an inquiry, the application server may return a shared library with a list of all (or a subset) of the JAR files that are contained within the returned library.

At block 310, external code extraction module 215 of FIG. 2 additionally, or optionally, determines, discovers, and/or identifies any external common code within the monolithic application by analyzing the monolithic application. As noted above, in an example and in a Java enterprise application, a JAR file that is packaged inside multiple web application archive or web application resource files is identified as external common code. In other words, because the JAR file is packaged inside multiple web application archive or web application resource files, it is external common code. In an aspect of the invention, the determined, discovered, and/or identified hidden external common code is marked, tagged, or otherwise labeled as such, for additional processing.

In another example, external code extraction module 215 discovers the hidden external common code across the entire monolithic application estate. External code extraction module 215 builds a graph model of the entire monolithic application estate that represents applications and the software components (e.g., node(s), class(es), JAR file(s), software library element(s), etc.) that they use. External code extraction module 215, further determines any relationships between the software components to identify the hidden external common components—the components that are common between applications. In other words, when external code extraction module 215 discovers that multiple Java applications internally package the same jar file, such applications are identified as hidden external common code.

In yet another example, external code extraction module 215 leverages build configuration information to discover hidden external common code. In this context, external code extraction module 215 analyses deployed applications, because it allows external code extraction module 215 to analyse an entire application estate as a single task and compare results across all applications. However, this specific exemplary method comes at a cost because build configuration information is not generally readily available. Additionally, there is the risk that not all common code would be described in the build configuration. For example, JAR files may be manually dropped into a Java application by an application developer, and while this is not a best practice, it is common, and renders build configuration information as unreliable for this purpose.

In an aspect of the invention, external code extraction module 215 of FIG. 2 may optionally communicate with one or more of data sources 230, knowledge base 235, user device 240, or another third-party software, instructions, or logic to determine, discover, or identify any external common code within the monolithic application source.

At block 315, internal code extraction module 220 of FIG. 2 additionally, or optionally, determines, discovers, and/or identifies any third-party code within the monolithic application by analyzing the monolithic application. In an example, internal code extraction module compares software components (e.g., class, JAR file, software library element, etc.) in the application against known third-party lists and/or by checking software components for availability in known public repositories. Internal code extraction module 220 obtains the third-party lists and/or public repositories by interrogating data sources 230, knowledge base 235, user device 240, or another list or repository via network 250 of FIG. 2.

In an embodiment, internal code extraction module 220 interrogates data sources 230, knowledge base 235, user device 240, a third-party list, or repository using an interrogation script in an automated manner. In another embodiment, the refactoring analysis server 210 of FIG. 2, maintains a list of known third-party libraries that are in use in the enterprise or organization. And as internal code extraction module 220 encounters code libraries, it may compare the encountered libraries against the maintained list of known third-party libraries. According to an aspect of the invention, the interrogation script and subsequent comparison are performed in an automated manner.

At block 320, internal code extraction module 220 of FIG. 2 determines, discovers, and/or identifies hidden internal common code by analyzing the monolithic application. In an example, identifying hidden internal common code includes determining the name of software components. For example, when a Java package, or class, name contains the text "util," the name alone may signify that the "util"-named file, package, or class is hidden internal common code. An example of a common Java package that may fit this description is the file db_util-which generally contains utility code for accessing a database. The db_util file would be identified as hidden internal common code. This method relies on the enterprise, or organization, software developers using traditional naming conventions, but this is not always the case. In these instances, analyzing the file name may be unreliable.

In another example, identifying hidden internal common code includes determining the scope of software components. For example, when a Java component (e.g., class) contains methods that are declared to be "static," meaning it allows the code or methods to be used without instantiation objects, it is hidden internal common code. However, an application's scope is not always a reliable indicator. That is, application-wide scope may not always indicate that a utility is commonly used across the application. Additionally, not all hidden common code has an application-wide scope.

In yet another example, internal code extraction module 220 generates a call graph, like that of FIG. 4A described herein below, for the application using static analysis-which involves analyzing the binary code of a program without executing it.

Figure 5A:
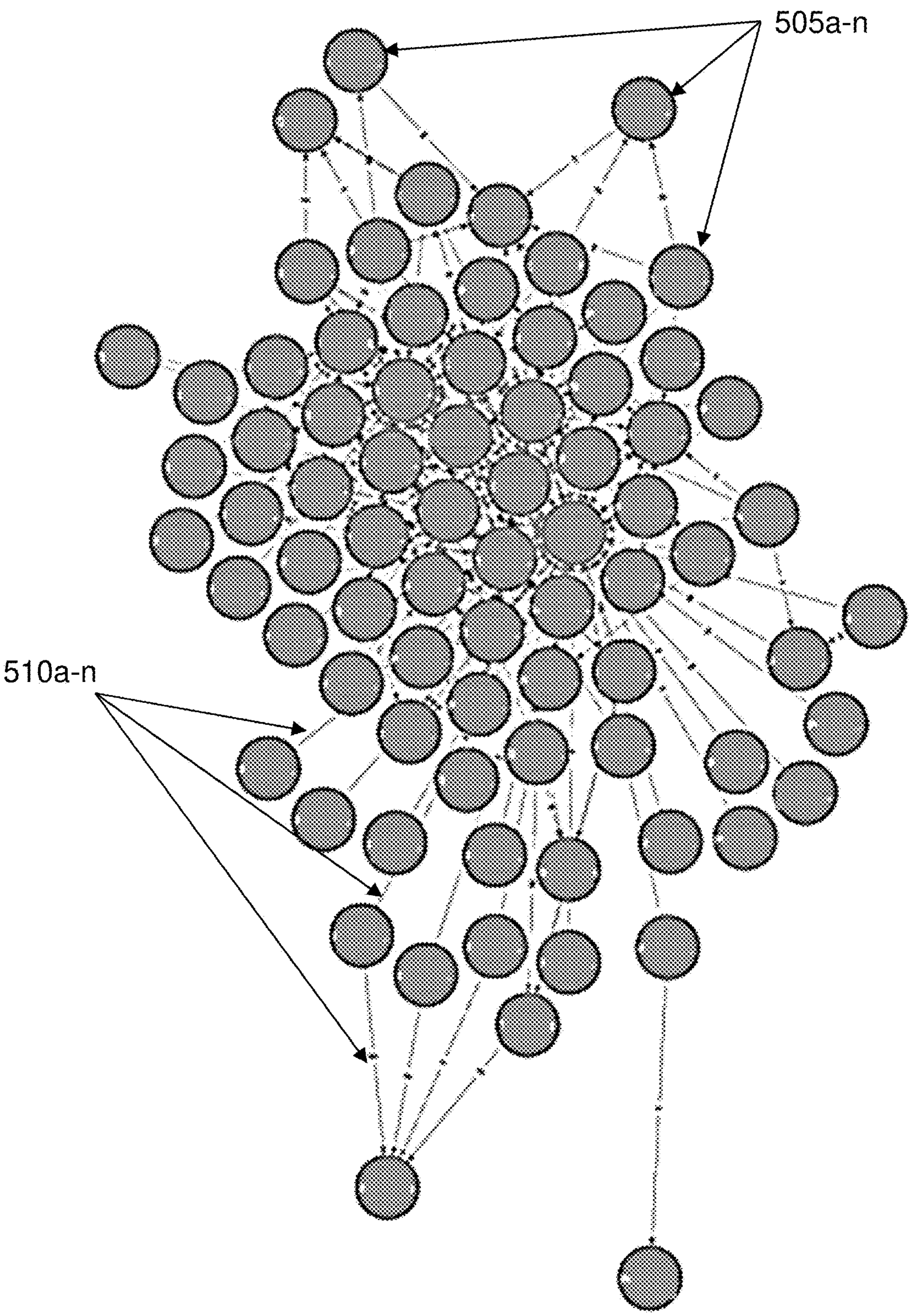
FIGS. 5A and 5B depict call graphs according to an embodiment of the present invention.
Figure 5B:
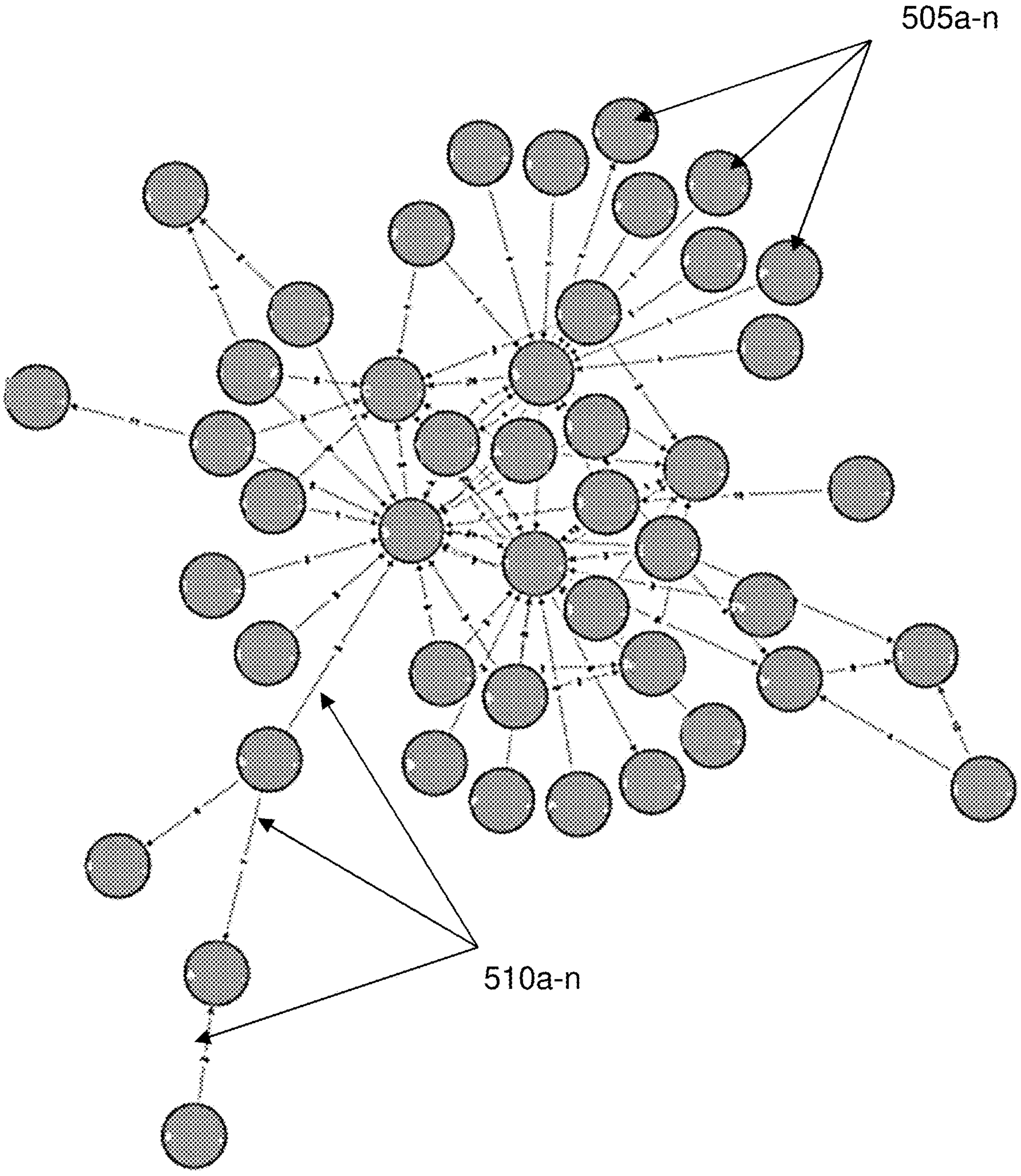

At block 325 of FIG. 3, internal code extraction module 220 of FIG. 2 is configured to identify and/or isolate the unique application code (e.g., pre-refactoring code) by excluding the internal and external common code and third-party code determined, discovered, and or identified in the methods associated with at least one of blocks 305, 310, 315, and/or 320, described above. In an embodiment, any code that is not the internal and external common code and third-party code determined, discovered, and/or identified in the methods associated with at least one of blocks 305, 310, 315, and/or 320, may be the unique application code. In some embodiments, identifying the unique application code is a process of elimination where it is the code remaining after the internal and external common code and third-party code determined, discovered, and or identified. In embodiments, isolation occurs by excluding all but the unique application code (e.g., pre-refactoring code). This identification and/or isolation may be beneficial to the accuracy of analysis. That is, removing the external and internal common code and any third-party code significantly reduces the number of dependencies that are considered when understanding the magnitude of, and when considering the suitability of, a refactoring task. The reduction of the number of dependencies is depicted in FIGS. 5A and 5B, described herein below.

In an embodiment, the refactoring analysis server 210 may be configured to generate an objective rating that indicates the difficulty and/or suitability for refactoring the analyzed monolith application to microservices based on the degree of connectiveness determined using the methods described herein. The objective rating may be given as a software quality metric that describes the degree of connectiveness across the analyzed monolithic application.

At block 330, internal code extraction module 220 of FIG. 2 is configured to generate a unique code module (e.g., a JAR file) comprising at least the unique application code (e.g., pre-refactoring code) isolated at block 325. In an embodiment, internal code extraction module 220 is also configured to repackage the external and internal common code as a library in the microservices that might require it. In other cases, the external and internal common code may be extracted as a microservice of its own. In this circumstance, internal code extraction module 220 would not need to consider breaking dependencies between common code and the unique application code (e.g., pre-refactoring code) when assessing the suitability for refactoring a monolith application into a microservice.

At block 335 of FIG. 3, the refactoring analysis server 210 of FIG. 2 is configured to transmit the unique code module comprising at least the isolated unique application code to at least one of data sources 230, knowledge base 235, and/or user device 240. In embodiments, the refactoring analysis server 210 is also configured to transmit a reusable module that includes relied-upon common code and/or third-party code, to be used by any subsequently generated microservices.

In an embodiment, the refactoring analysis server 210 of FIG. 2 may further provide, or determine, a score indicating the suitability, feasibility, and/or likelihood of success for refactoring the monolithic application to a microservice architecture. In such embodiments, the score may be based on one or more of the blocks illustrated in FIG. 3. In other words, the score may be based on any discovered explicitly declared common code, hidden external common code, third-party common code, hidden internal common code, any isolated unique application code, and/or a generated unique code module, or any combination thereof. The score may be further determined based using a weighting value. In embodiments, the score may also be determined by comparing a first call graph having a number of components and connections representing the total received code before performing the method described with respect to FIG. 3 (e.g., illustrated in FIG. 5A) against a second call graph having a number of components and connections of a unique code module after performing the method described with respect to FIG. 3 (e.g., illustrated in FIG. 5B). Refactoring analysis server 210 may determine a score based on the second call graph showing the components and connections of the unique code module being less complicated (i.e., fewer connections between fewer components) than the first call graph.

Figure 4A:
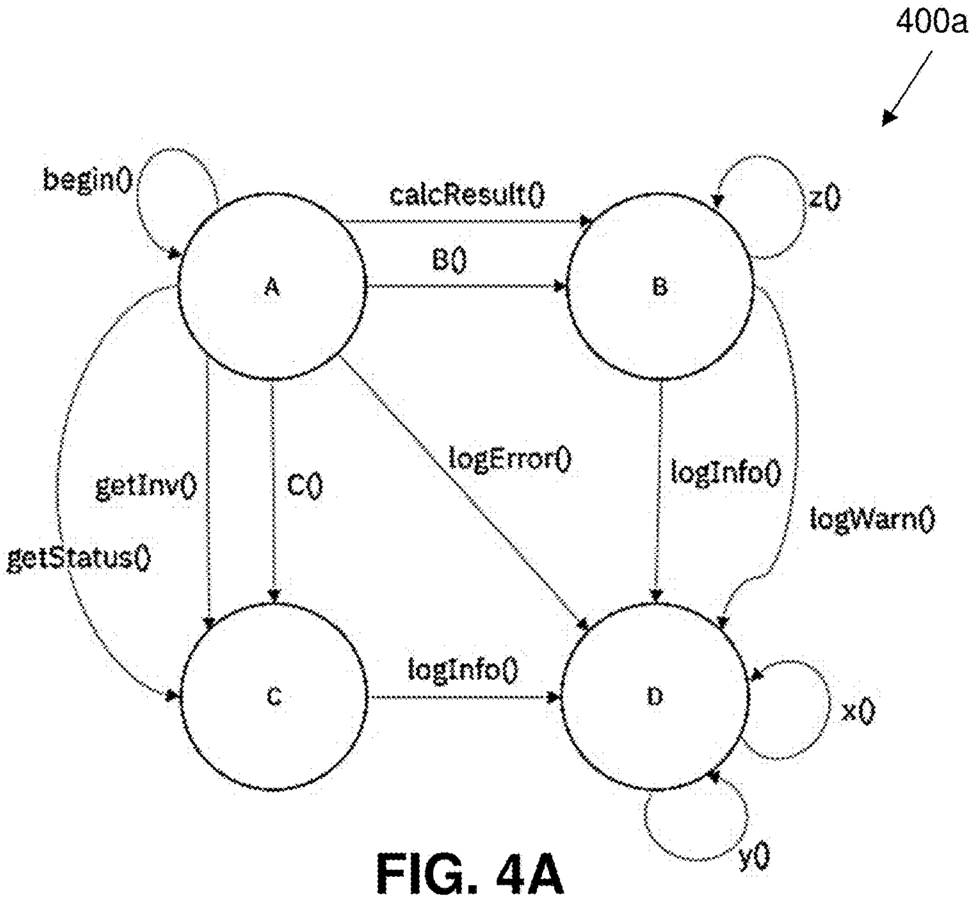
FIGS. 4A and 4B depict call graphs according to an embodiment of the present invention.

As depicted in FIG. 4A, call graph 400*a* represents the calling relationships between subroutines in a computer program. FIG. 4A depicts an example call graph for a simple Java program that contains four components: A, B, C, D. For example, when component A performs the calcResult( ) function/method, it makes a call to component B. Similarly, when component B performs the logInfo( ) function/method, it makes a call to component D. Additional relationships are illustrated in FIG. 4A, where each arrow represents a call from one component to another or from one component to itself. As used herein, components depicted in FIG. 4A, may be nodes, classes, software library elements, files, JAR files, structures, c-program files, or software components.

Figure 4B:
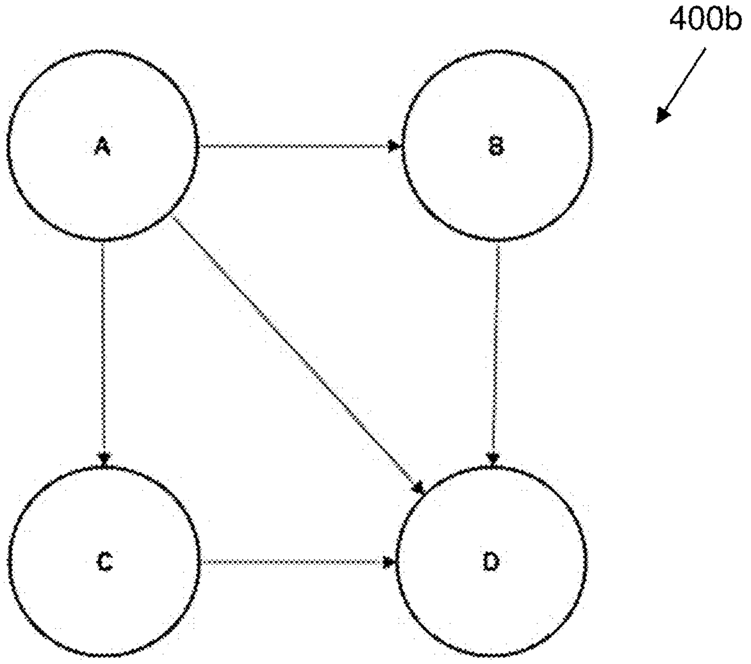

Internal code extraction module 220 further generates simplified call graph 400*b*, as illustrated in FIG. 4B, by aggregating the subroutine calls to the software component level. For example, FIG. 4B depicts the relationships between components A, B, C, D. An arrow between components means that the source component calls at least one method in the destination component. In an embodiment, internal code extraction module 220 may use the same or different programs to generate the call graph(s) and simplified call graph(s).

After generating one or both types of call graphs, internal code extraction module 220 further determines the number of incoming and outgoing edges for a component. An incoming edge is depicted as a component that receives a call, whereas the outgoing edge is depicted as a call being generated from a specific component. A function call from one component (e.g., class A, B, C, or D) to another component.

Referring again to FIGS. 4A and 4B, the number of incoming and outgoing edges for each component are summarized in the following table:

| Component (Class) | Incoming Edges | Outgoing Edges |
|---|---|---|
| A | 0 | 3 |
| B | 1 | 1 |
| C | 1 | 1 |
| D | 3 | 0 |

In some embodiments, internal code extraction module 220 may further determine and count the number of outgoing edges to external common code components, if any.

After determining the number of incoming and outgoing edges, internal code extraction module 220 further determines whether the number of edges meets or exceeds a specific threshold. For example, in an embodiment, when a component has two or more incoming edges and has zero outgoing edges to external common code components, the component is identified as being internal common code.

Additionally, if the number of outgoing edges from a component are non-zero, but, all the outgoing edges are connected to internal common code components, the component is identified as being internal common code. This scenario also covers an instance, for example, where one common code component would depend on another common code component. In such cases, internal code extraction module 220 recurses over the call graph(s) to discover these relationships.

To further refine the identification of hidden internal common code components, internal code extraction module 220 applied weighting to the discovered internal common code components. According to aspects of the invention, the weighting is a function of the number of components that use the internal common code component. For example, if a high percentage or a high number of application components use (e.g., make calls to) a component being analyzed as possible hidden internal common code, then the weighting value would be higher, and internal code extraction module 220 may conclude that the component is identified as being an internal common code. Conversely, if the discovered internal common component is used by a low number of application components, the weighting value would be lower, and additional investigation may be needed to determine whether the component should be identified as an internal common component. In each example, the weighting value may be compared to a threshold value. If the weighting value exceeds the threshold value, the associated component may be identified as hidden internal code. Alternatively, if the weighting value does not exceed the threshold, the associated component may be identified as unique application code. The threshold value may be set as a number or a percentage value and may be based on the specific needs or characteristics of the monolithic application being analyzed. The weighting of the call graphs depicted in FIGS. 4A and 4B is summarized in the following table:

| Component (Class) | Incoming Edges | Outgoing Edges | Weighting |
|---|---|---|---|
| A | 0 | 3 | N/A (A not common) |
| B | 1 | 1 | N/A (B not common) |
| C | 1 | 1 | N/A (C not common) |
| D | 3 | 0 | 100% (Hidden internal common code) |

In yet another example, internal code extraction module 220 may operate in a recursive fashion. That is, when a component is determined to have both incoming and outgoing edges, it may still be hidden internal common code. Internal code extraction module 220 may analyze each component (or node) down the tree of components (or nodes) to determine the number of dependencies and whether the intermediate components are also hidden internal common code.

FIG. 5A illustrates an exemplary simplified call graph of a monolith application before the internal and external common code and third-party code is excluded. That is, the application depicted in FIG. 5A displays 108 unique components 505*a-n*, depicted as circles, having 263 relationships or dependencies 510*a-n* (e.g., outgoing edges) depicted as lines going between the components 505*a-n* or circles. An exemplary result of the foregoing exclusion in accordance with aspects of the invention is illustrated in FIG. 5B, showing 97 unique components having 87 relationships. That is, after going through the foregoing exclusion process, approximately 11 components and 176 relationships are removed when extracting the common code and/or third-party code, leaving a more feasible amount of pre-refactoring code. In an embodiment the call graphs depicted in FIGS. 5A and 5B are generated using a static analysis.

Figure 6:
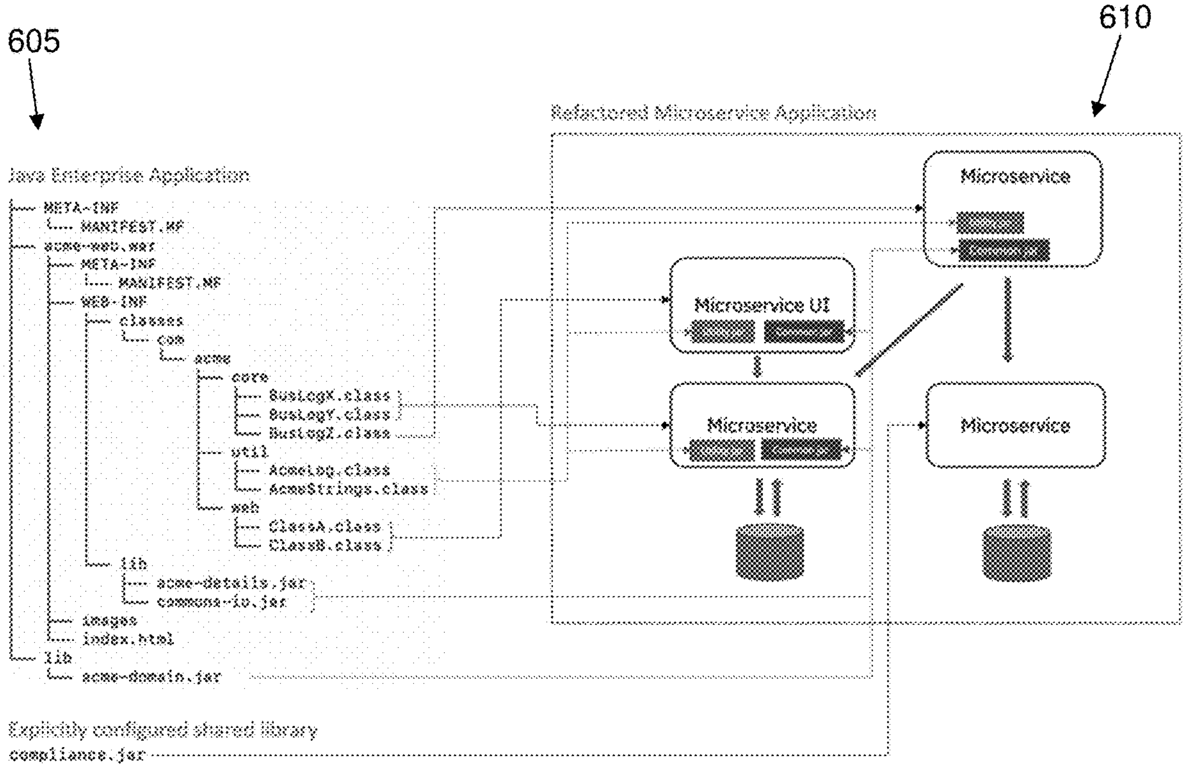
FIG. 6 depicts an example of mapping an anatomy of a Java enterprise monolithic application to microservice applications according to an embodiment of the present invention.

FIG. 6 depicts an example of an anatomy of Java enterprise monolithic application 605 on the left portion and how those portions are mapped to various microservice applications 610 on the right portion. Specifically, in this example, Java enterprise monolithic application 605 includes components such as classes and internal libraries, and explicitly configured common code. Each of these components of the monolithic application are mapped to specific portions of microservice applications 610. This may be performed by bundling one or more of the components, internal libraries, and explicitly configured common code into a JAR file and add the JAR file to one or more microservices, to preserve the dependencies between the core logic of the application. In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Figure 7:
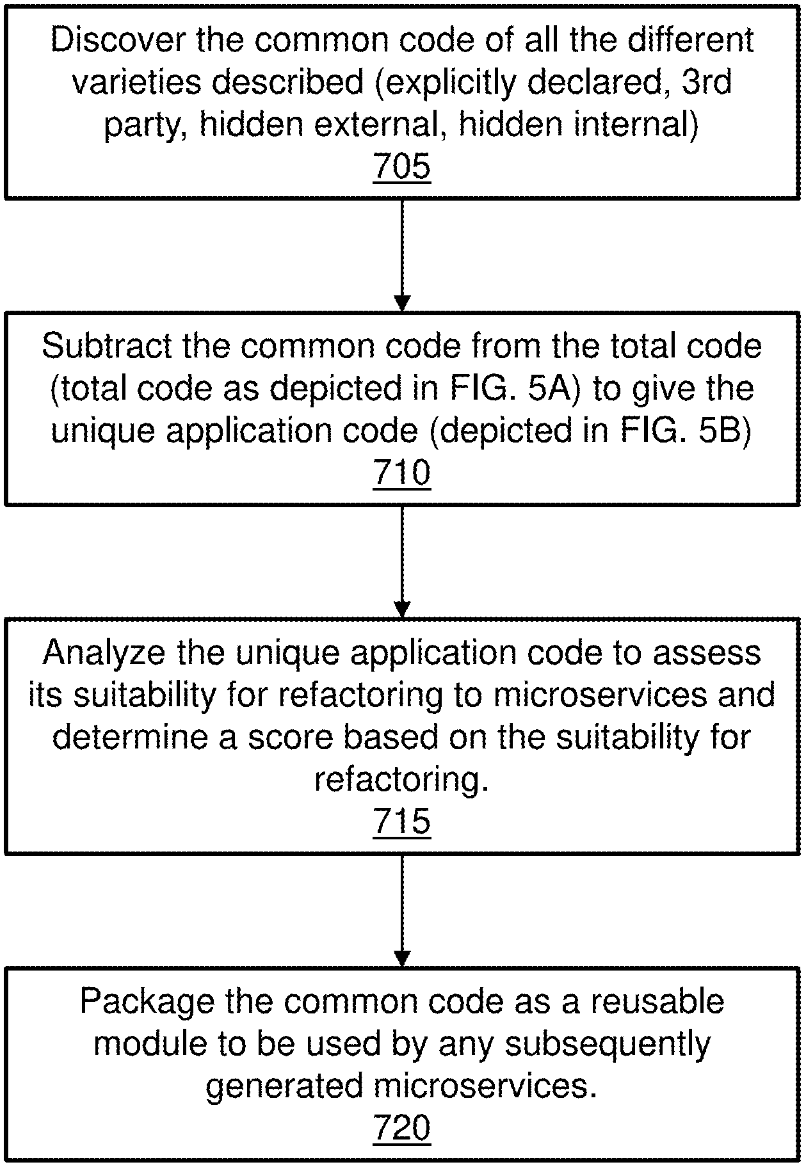
FIG. 7 shows a flowchart of an exemplary method in accordance with aspects of the present invention.

FIG. 7 shows a flowchart of an exemplary method in accordance with aspects of the present invention. At block 705, refactoring analysis server 210 of FIG. 2 discovers the common code of all the different varieties as described above (e.g., explicitly declared common code, third-party common code, hidden external common code, and hidden internal common code).

At block 710, refactoring analysis server 210 of FIG. 2 subtracts the common code from the total code (e.g., as depicted in FIG. 5A) to give just the unique application code (e.g., as depicted in FIG. 5B). In embodiments, the subtracting process may also be referred to as isolating the unique application code. The purpose of this feature is to separate the common code from the unique application code or to separate the unique application code from the common code.

At block 715, refactoring analysis server 210 of FIG. 2 analyzes the unique application code to assess its suitability for refactoring to microservices. As explained above, the score may be determined by comparing a first call graph having a number of components and connections representing the total received code before performing the method described with respect to FIG. 3 (e.g., illustrated in FIG. 5A) against a second call graph having a number of components and connections of a unique code module after performing the method described with respect to FIG. 3 (e.g., illustrated in FIG. 5B). Refactoring analysis server 210 may determine a score based on the second call graph showing the components and connections of the unique code module being less complicated (i.e., fewer connections between fewer components) than the first call graph. At block 720, refactoring analysis server 210 of FIG. 2 packages the common code as a reusable module to be used by any subsequently generated microservices.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, binary code associated with a monolithic application;

discovering, by the processor set, hidden internal common code by performing a static analysis of the binary code, wherein the static analysis includes:

generating a call graph representing calling relationships between components of the monolithic application; and determining, for each component, a number of incoming and outgoing edges in the call graph;

identifying, by the processor set, unique application code based on a weighting value of the components associated with the monolithic application being less than a threshold value that is set based on characteristics of the monolithic application, the weighting value being determined from the call graph based depending on a number of the components that use the discovered hidden internal common code;

generating, by the processor set, a unique code module comprising the unique application code; and refactoring, by the processor set, the monolithic application into a microservice architecture based on the unique code module.

2. The computer-implemented method of claim 1, further comprising discovering, by the processor set, explicitly declared common code by analyzing the binary code associated with the monolithic application.

3. The computer-implemented method of claim 1, further comprising discovering, by the processor set, hidden external common code by analyzing the binary code associated with the monolithic application.

4. The computer-implemented method of claim 1, further comprising determining, by the processor set, third-party common code by analyzing the binary code associated with the monolithic application.

5. The computer-implemented method of claim 1, further comprising isolating, by the processor set, the unique application code from the hidden internal common code of the binary code associated with the monolithic application.

6. The computer-implemented method of claim 1, wherein the unique application code describes the components of the monolithic application.

7. The computer-implemented method of claim 1, wherein receiving the binary code associated with the monolithic application comprises obtaining, by the processor set, the binary code associated with the monolithic application by accessing at least one of a data source or a knowledge base.

8. The computer-implemented method of claim 1, wherein the static analysis further comprises determining dependencies between the components of the monolithic application.

9. The computer-implemented method of claim 1, further comprising determining, by the processor set, a refactoring suitability score by comparing the received binary code associated with the monolithic application against the generated unique code module.

10. A computer program product comprising one or more computer readable storage media having program instructions collectively stored on the one or more computer readable storage media, the program instructions executable to:

receive binary code associated with a monolithic application;

discover hidden internal common code by performing a static analysis of the binary code, wherein the static analysis includes:

generating a call graph representing calling relationships between components of the monolithic application; and determining, for each component, a number of incoming and outgoing edges in the call graph;

identify unique application code based on a weighting value of the components associated with the monolithic application being less than a threshold value that is set based on characteristics of the monolithic application, the weighting value being determined from the call graph based on a number of the components that use the discovered hidden internal common code;

generate a unique code module comprising the unique application code; and refactor the monolithic application into a microservice architecture based on the unique code module.

11. The computer program product of claim 10, wherein the program instructions are further executable to discover explicitly declared common code by analyzing the binary code associated with the monolithic application.

12. The computer program product of claim 10, wherein the program instructions are further executable to discover hidden external common code by analyzing the binary code associated with the monolithic application.

13. The computer program product of claim 10, wherein the program instructions are further executable to a third-party common code by analyzing the binary code associated with the monolithic application.

14. The computer program product of claim 10, wherein the program instructions are further executable to isolate the unique application code from the hidden internal common code of the binary code associated with the monolithic application.

15. The computer program product of claim 10, wherein the static analysis further comprises determining dependencies between the one or more software components associated with the monolithic application.

16. The computer program product of claim 10, wherein the program instructions are further executable to determine a refactoring suitability score by comparing the received binary code associated with the monolithic application against the generated unique code module.

17. A system comprising:

a processor set, one or more computer readable storage media, and program instructions collectively stored on the one or more computer readable storage media, the program instructions executable to:

receive binary code associated with a monolithic application;

discover hidden internal common code by performing a static analysis of the binary code, wherein the static analysis includes:

generating a call graph representing calling relationships between components of the monolithic application; and determining, for each component, a number of incoming and outgoing edges in the call graph;

identify unique application code based on a weighting value of the components associated with the monolithic application being less than a threshold value that is set based on characteristics of the monolithic application, the weighting value depending on a number of the components that use the discovered hidden internal common code;

generate a unique code module comprising the unique application code; and refactor the monolithic application into a microservice architecture based on the unique code module.

18. The system of claim 17, wherein the program instructions are further executable to:

discover explicitly declared common code, hidden external common code, and third-party common code by analyzing the binary code associated with the monolithic application; and isolate the unique application code from the discovered hidden internal common code, explicitly declared common code, hidden external common code, and third-party common code.

* * * * *